United States Patent
Baughman et al.

(10) Patent No.: US 12,093,293 B2
(45) Date of Patent: Sep. 17, 2024

(54) SYNCHRONIZING A SENSOR NETWORK AND AN ONTOLOGY

(71) Applicant: International Business Machines Corporation, Armonk, NY (US)

(72) Inventors: Aaron K. Baughman, Cary, NC (US); Sarbajit K. Rakshit, Kolkata (IN); Gray Franklin Cannon, Atlanta, GA (US); Stephen C Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 17/683,178

(22) Filed: Feb. 28, 2022

(65) Prior Publication Data

US 2023/0273943 A1  Aug. 31, 2023

(51) Int. Cl.
*G06F 16/332* (2019.01)
*G06F 16/35* (2019.01)
*G06F 40/284* (2020.01)
*H04W 4/38* (2018.01)

(52) U.S. Cl.
CPC .......... *G06F 16/3329* (2019.01); *G06F 16/35* (2019.01); *G06F 40/284* (2020.01); *H04W 4/38* (2018.02)

(58) Field of Classification Search
CPC ...... G06F 3/167; G06F 1/1605; G06F 1/1643; G06F 3/0412; G06F 16/3329; G06F 16/35; G06F 40/284; G10L 15/22; H04M 1/72533; H04R 1/083; H04R 27/00; H04W 4/38
See application file for complete search history.

(56) References Cited

U.S. PATENT DOCUMENTS

| | | | |
|---|---|---|---|
| 8,849,652 B2 * | 9/2014 | Weider | G10L 21/06 704/270.1 |
| 8,995,981 B1 * | 3/2015 | Aginsky | H04M 1/72415 455/419 |
| 9,345,054 B1 * | 5/2016 | Lu | H04M 1/72415 |
| 9,443,527 B1 * | 9/2016 | Watanabe | G10L 15/30 |
| 9,990,129 B2 * | 6/2018 | Yang | G06F 3/04817 |
| 10,157,042 B1 * | 12/2018 | Jayakumar | H04R 27/00 |
| 10,237,237 B2 * | 3/2019 | Dawes | H04L 67/01 |

(Continued)

FOREIGN PATENT DOCUMENTS

| | | |
|---|---|---|
| CN | 102622341 A | 8/2012 |
| CN | 111209406 A | 5/2020 |

(Continued)

OTHER PUBLICATIONS

"Automatic Knowledge Base Ontology Expansion Using Query Logs and User Activity Records", An IP.com Prior Art Database Technical Disclosure, IP.com No. IPCOM000259564D, IP.com Electronic Publication Date: Aug. 23, 2019, 4 pps.

(Continued)

*Primary Examiner* — Mohammad K Islam
(74) *Attorney, Agent, or Firm* — David K. Mattheis

(57) ABSTRACT

Synchronizing a sensor network and an ontology by analyzing outputs of a set of sensors, analyzing relationships of an ontology, mapping the outputs to the relationships, identifying a correlation among the outputs, and modifying the ontology according to the correlation.

17 Claims, 4 Drawing Sheets

(56) References Cited

U.S. PATENT DOCUMENTS

| | | | |
|---|---|---|---|
| 10,410,630 B2 * | 9/2019 | Weng | G10L 15/02 |
| 10,417,266 B2 | 9/2019 | Patel | |
| 10,748,546 B2 * | 8/2020 | Kim | G10L 15/30 |
| 2004/0210647 A1 * | 10/2004 | Jin | H04L 12/2803 709/220 |
| 2009/0313026 A1 * | 12/2009 | Coffman | H04M 3/493 704/E15.04 |
| 2012/0130513 A1 * | 5/2012 | Hao | G05B 15/02 700/90 |
| 2013/0211710 A1 * | 8/2013 | Kennewick | G10L 15/08 704/275 |
| 2014/0135952 A1 * | 5/2014 | Maehara | G05B 15/02 700/90 |
| 2014/0324410 A1 * | 10/2014 | Mathews | G09B 9/00 703/22 |
| 2015/0256620 A1 * | 9/2015 | Sugano | H04L 67/1095 709/217 |
| 2015/0269139 A1 | 9/2015 | McAteer | |
| 2015/0379993 A1 * | 12/2015 | Subhojit | G10L 15/06 704/275 |
| 2016/0283191 A1 * | 9/2016 | Lu | G06F 3/165 |
| 2016/0344569 A1 * | 11/2016 | Chun | G06F 3/04817 |
| 2017/0105095 A1 * | 4/2017 | Um | H04W 4/70 |
| 2017/0116986 A1 * | 4/2017 | Weng | G10L 13/033 |
| 2017/0256256 A1 * | 9/2017 | Wang | G10L 15/26 |
| 2018/0013815 A1 * | 1/2018 | Gold | H04L 63/00 |
| 2018/0137858 A1 * | 5/2018 | Saxena | H04L 12/2816 |
| 2018/0165061 A1 * | 6/2018 | Nicolich-Henkin | H04L 12/282 |
| 2018/0182387 A1 * | 6/2018 | Chua | H04R 1/406 |
| 2018/0285065 A1 * | 10/2018 | Jeong | G06F 3/167 |
| 2018/0285070 A1 * | 10/2018 | Yoon | G06F 3/0481 |
| 2018/0314490 A1 * | 11/2018 | Lee | G10L 15/22 |
| 2019/0005944 A1 * | 1/2019 | Subhojit | G10L 15/22 |
| 2019/0058783 A1 * | 2/2019 | Reid | G06F 3/03547 |
| 2019/0172467 A1 * | 6/2019 | Kim | G10L 15/16 |
| 2019/0215184 A1 * | 7/2019 | Emigh | G05B 15/02 |
| 2019/0287522 A1 * | 9/2019 | Lambourne | H04R 3/12 |
| 2019/0304455 A1 * | 10/2019 | Jaygarl | G10L 15/08 |
| 2020/0007356 A1 * | 1/2020 | Mason | H05B 47/155 |
| 2020/0028734 A1 * | 1/2020 | Emigh | H04L 67/10 |
| 2020/0234709 A1 * | 7/2020 | Kunitake | G06F 3/167 |
| 2021/0042532 A1 | 2/2021 | Latapie | |
| 2021/0081499 A1 | 3/2021 | Rakshit | |
| 2021/0209144 A1 | 7/2021 | Trim | |

FOREIGN PATENT DOCUMENTS

| | | | |
|---|---|---|---|
| EP | 1933499 A1 * | 6/2008 | H04L 41/082 |
| KR | 1020210004057 A | 7/2019 | |
| WO | WO-9859282 A2 * | 12/1998 | H04L 12/2803 |
| WO | 2021148658 A1 | 7/2021 | |
| WO | 2021160857 A1 | 8/2021 | |

OTHER PUBLICATIONS

"Method for Identifying Important Fields in Dataset in Business Intelligence", An IP.com Prior Art Database Technical Disclosure, IP.com No. IPCOM000262631D, IP.com Electronic Publication Date: Jun. 16, 2020, 7 pps.

"Ontology Based Query Correction without query logs", An IP.com Prior Art Database Technical Disclosure, IP.com No. IPCOM000247799D, IP.com Electronic Publication Date: Oct. 6, 2016, 6 pps.

Belmonte et al., "Program understanding using ontologies and dynamic analysis", SAC '18: Proceedings of the 33rd Annual ACM Symposium on Applied Computing, Apr. 2018, pp. 1552-1559, <https://dl.acm.org/doi/10.1145/3167132.3167298>.

Belmonte et al., "Using domain ontologies in a dynamic analysis for program comprehension", ODiSE'10: Ontology-Driven Software Engineering, Oct. 2010, Article No. 8, pp. 1-6, <https://doi.org/10.1145/1937128.1937136>.

Dey, et al., "Learning Models for Semantic Classification on Insufficient Plantar Pressure Extractions", International Journal of Interactive Multimedia and Artificial Intelligence—Feb. 2020, 10 pps.

Globa et al., "Examples of Ontology Model Usage in Engineering Fields", Published: Feb. 20, 2018, 38 pps., <https://www.intechopen.com/chapters/59449>.

Mell et al., "The NIST Definition of Cloud Computing", National Institute of Standards and Technology, U.S. Department of Commerce, NIST Special Publication 800-145, Sep. 2011, 7 pages.

Moss et al., "Program interpolation", PEPM '09: Proceedings of the 2009 ACM SIGPLAN workshop on Partial evaluation and program manipulation, Jan. 2009, pp. 31-40, <https://dl.acm.org/doi/10.1145/1480945.1480951>.

Shirwadkar et al., "Method and System for Processing and Answering Factual Questions Over Structured Data", IP.com No. IPCOM000258994D, An IP.com Prior Art Database Technical Disclosure, IP.com Electronic Publication Date: Jul. 2, 2019, Copyright: Yahoo! 2019, All rights reserved, 6 pps.

Xue, et al., "Integrating Sensor Ontologies With Global and Local Alignment Extraction", Hindawi, Wireless Communications and Mobile Computing, vol. 2021, Article ID 6625184, 10 pages.

Zhu, et al., "Semi-Supervised Learning-Based Sensor Ontology Matching", Hindawi, Security and Communication Networks, vol. 2021, Article ID 2002307, 5 pages.

"Patent Cooperation Treaty PCT Notification of Transmittal of the International Search Report and the Written Opinion of the International Searching Authority, or the Declaration", Applicant's file reference F22W3535, International application No. PCT/CN2023/078126, International filing date Feb. 24, 2023, Date of mailing May 30, 2023, 8 Pages.

* cited by examiner

SYNCHRONIZING A SENSOR NETWORK AND AN ONTOLOGY

FIELD OF THE INVENTION

The disclosure relates generally to the machine learning-based synchronization of a sensor network and an ontology. The disclosure relates particularly to machine learning-based synchronization of a sensor network and an ontology for a question answering system An ontology formally represents knowledge as a set of concepts within a domain, and the relationships between those concepts. An ontology may be used to model a domain and support reasoning about concepts within the domain.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable synchronizing a sensor network and an ontology.

Aspects of the invention disclose methods, systems and computer readable media associated with synchronizing a sensor network and an ontology by analyzing outputs of a set of sensors, analyzing relationships of an ontology, mapping the outputs to the relationships, identifying a correlation among the outputs, and modifying the ontology according to the correlation.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
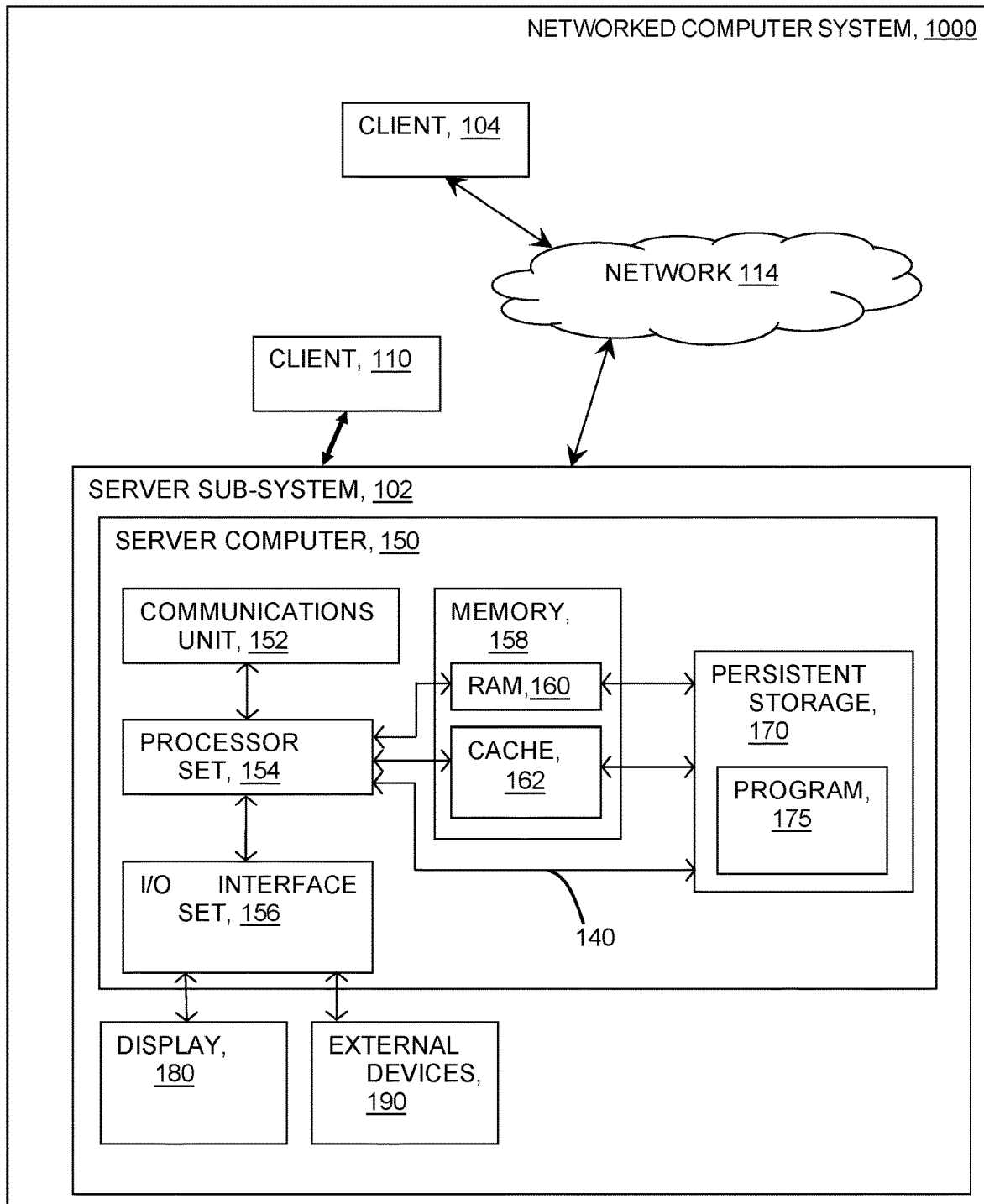
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

An Ontology helps to formalize business rules and processes. A formal ontology provides a way to clarify and to retain key knowledge within the company. Semantic Web technology makes it possible for business rules to be incorporated directly into business systems, helping to ensure that those systems agree about key terms in the business. Since the business rules can thus be maintained outside of the hard code of the business systems, it becomes be possible to change those business rules more quickly, without lengthy computer programming and testing delays.

Sensors capture various sources of data, and may be used for analyzing various business processes, performances. And business ontology talks about the concept relationship among various context of business, so, there is a need to align the sensor network with the ontology hierarchy of the business, at the same time, both the ontology hierarchy and sensor network should update each other and always be sync with each other.

The combination of sensor data associated with the physical or digital movements of data and language may be interpreted for humans to understand. Neurosymbolic programming joins semantic and sensor data together into a structured scene representation that can be queried. Users can pose natural language questions which are translated into an executable program running on top of the structured scene interpretation. This form of question and answer system built around a synchronized sensor network and associated business ontology enables an accessible way to interpret both the meaning of ontology language and sensor data.

Aspects of the present invention relate generally to question answering systems and, more particularly, to synchronizing sensor networks and business ontologies for answering questions. In embodiments, analysis of sensor outputs and existing business ontology hierarchies associates sensors and related ontology concepts. Mapping sensors to associated ontology concepts and relationships, documents the results of the analysis. Further analysis, such as Bayesian analysis, of the sensor outputs identifies previously hidden or unknown correlations among the sensor outputs. Disclosed methods then update an associated business ontology hierarchy according to the identified sensor output correlations. The updates to the ontology reflect the strength of the identified sensor output correlations. Changes to the ontology result in the generation of relationships between portions of the sensor network as well as changes in the monitoring of the sensors.

In accordance with aspects of the invention there is a method for automatically adjusting the content of a business ontology using relationships identified between networked system sensors, the method comprises: analyzing the outputs of a set of system sensors, analyzing the relationships expressed in an ontology, mapping sensor outputs to ontology relationships, identifying correlations among the sensor outputs, and modifying the ontology according to the identified correlations. The modifications include an indication of the strength of the identified correlation. In an embodiment, the method further comprises identifying changes in the ontology relationships and mapping such changes to the sensor network.

Aspects of the invention provide an improvement in the technical field of QA systems. Conventional QA systems utilize static (i.e., unchanging) confidence thresholds when deciding whether to provide an answer to a question posed by a user. Disclosed embodiments continually modify such confidence levels according to changes in sensor output correlations.

Aspects of the invention also provide an improvement to computer functionality. In particular, implementations of the invention are directed to a specific improvement to the way QA systems operate, embodied in the continually adjusted confidence thresholds that approximates an identified correlation strength. In embodiments, the system adjusts the confidence threshold each time sensor network correlations, or ontology relationships, change, such that the confidence threshold that is applied to the next question differs from the confidence threshold that is applied to the current question according to changes in the ontology and/or sensor output correlations. In this manner, embodiments of the invention affect how the QA system functions, i.e., the answer to ontology relationship related questions reflects changes to correlations in sensor outputs associated with the relationship.

As an overview, a QA system is an artificial intelligence application executed on data processing hardware that answers questions pertaining to a given subject-matter domain (ontology) presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain. The method analyses the outputs of networked sensors associated with the domain, maps the sensor outputs to the identified domain ontology relationships. Disclosed methods then identify hidden correlations among the sensor output data and modify the domain ontology relationships according to the identified sensor data correlations.

In an embodiment, one or more components of the system can employ hardware and/or software to solve problems that are highly technical in nature (e.g., analyzing the relationships of an ontology, analyzing the outputs of a network of sensors, mapping the sensor outputs to the ontology relationships, identifying correlations among the senor outputs, modifying the ontology according to the correlations etc.). These solutions are not abstract and cannot be performed as a set of mental acts by a human due to the processing capabilities needed to facilitate synchronizing sensor outputs and ontology relationships for a question answering system, for example. Further, some of the processes performed may be performed by a specialized computer for carrying out defined tasks related to question answering systems. For example, a specialized computer can be employed to carry out tasks related to synchronize system sensors and ontology relationships in support of a question answering system, or the like.

In an embodiment, a method for synchronizing a sensor network and an ontology, such as a business ontology, includes receiving an initial business ontology prepared by a business user or from another source. The initial ontology includes concepts associated with the business arranged in a manner reflecting relationships between those concepts. The initial ontology helps to formalize business rules and processes and provides a way to clarify and to retain key knowledge within the company. In this embodiment, the ontology may be developed by a natural language processing (NLP) evaluation of a body of company related documents.

The NLP evaluates the language of the respective documents, extracts concepts from the language and determines relationships between the concepts. The method analyzes documents and data associated with the ontology and updates the concepts and relationships of the ontology according to changes in the analyzed data over time. In an embodiment, the method utilizes a machine learning model, such as a long-short-term memory (LSTM) model trained according to labeled NLP outputs and ontological concepts-relationships using backpropagation and gradient descent to minimize a loss function of the model. In this embodiment, the method utilizes the LSTM to analyze changes in the underlying data set of the ontology over time to identify new concepts and relationships present in the changes to the data.

Disclosed embodiments can perform natural language processing for extraction of NLP output parameter values from provided documents of a user. NLP includes performing one or more of a topic classification process that determines topics of documents, one or more topic NLP output parameter values, a sentiment analysis process which determines sentiment parameter value for documents and document portions, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameter values, e.g., one of more "social tendency" NLP output parameter or one or more "writing style" NLP output parameter, and/or one or more part of speech NLP output parameter value.

In an embodiment, the method receives descriptions of a set of networked sensors associated with the business and the concepts of the business ontology. Sensors may provide access to various data sources usable for analyzing business processes expressed in the initial ontology. Sensors may include image sensors, including visible light, infra-red, and ultra-violet image sensors, auditory sensors, temperature sensors, motion detectors, load cells, current, fluid flow sensors, voltage, and EMF sensors, radio frequency detectors, smoke detectors, as well as various chemical detectors and other sensor types. The set of sensors may include one or more smart sensors which may be trained by the use of labeled training data to enable particular capabilities for the sensors. In an embodiment, the method applies NLP to the provided descriptions of the set of sensors in a manner similar to that described above with respect to the business-related documents. The NLP provides an initial set of relationships between the respective sensors as well as between the set of the sensors and the concepts and relationships of the business ontology.

In an embodiment, the method analyzes the outputs of the sensors in terms of the raw data and the changes in the data over time, monitoring the changes for trends and patterns in the changes of the data. In this embodiment, the method monitors the data streams from individual sensors for correlations between the data streams. In an embodiment, the method applies statistical correlation analysis to the data, determining a level of correlation between respective sensor outputs as well as a statistical level of confidence in the indication of a correlation between sensor outputs.

In an embodiment, the method evaluates sensor feeds which are initially correlated using NLP to test the level of correlation. In this embodiment, the method applies the NLP to textual outputs associated with the data feeds looking for a level of correlation similar to that derived statistically. As an example, a number of image sensors detect a vehicle and provide an output indicative of the detected vehicle. In this embodiment, the method applies the NLP to determine the level of correlation between the respective vehicle characterizations provided by the sensors. In an embodiment, the NLP converts the textual outputs to feature vectors and determines the separation between the respective feature vectors. The method compares the separation distance between vectors and the statistical correlation level and associated confidence level for the data streams. In this embodiment, the method clusters, or groups, related sensors and define relationships between sensor outputs according to the statistical analysis of the data feeds and the NLP analysis of the sensor textual outputs.

In an embodiment, the method combines the confidence levels of correlated sensors to yield an average confidence level for the set of correlated sensors. In this embodiment, the method compares the average confidence level to the NLP comparison of the sensor outputs. In an embodiment, the method utilizes the average confidence level in evaluating sensor performance. For example, the method and system may decide to ignore a single sensor having a confidence level falling below the average confidence level by a defined threshold. In an embodiment, the method may re-train the ignored sensor in an effort to raise the level of confidence of the sensor data, enabling usage of the sensor output by the system.

In a similar manner, the method applies the NLP to the ontology, converting the concepts and relationships of the ontology to feature vectors and determining the separation between respective feature vectors.

In an embodiment, a mapping function of the method maps, or associates, portions of the sensor network with portions of the business ontology according to identified correlations between the respective feature vector analysis of the sensor data outputs and the NLP feature vector analysis of the business ontology. This mapping associated sensors, or clusters of sensors with ontological concepts and the relationships between the concepts such that identified sensors cluster outputs are now defined as being related to identified concepts and relationships in the ontology such that changes in the data flows of the identified sensors or sensor clusters reflect changes associated with the concepts and defined relationships in the ontology. In an embodiment, the mapping function associates correlated sensors and concepts-relationship pairing according to the respective rates of change observed in the analysis of the ontology and sensor data streams.

In an embodiment, the method defines sensors and clusters of sensors as word embedding vectors, or word embeddings, the method further defines components of the ontology using the word embeddings, the method then maps the sensors and associated clusters of sensors, and ontology concepts according to matches, or similarities, between the respective sensor and concept-relationship word embeddings. In an embodiment, the method extracts features for the respective word embeddings of the sensors and the ontology elements according to changes in the sensor data and the ontology over time. In this embodiment, the method maps the sensors to the ontology according to the features related to changes over time in the word embedding of the sensors, sensor outputs, and the ontology concept and relationship elements. In an embodiment, the method compiles a table containing data associated with the correlated changes in the sensor output embeddings and the ontology embeddings over time. In an embodiment, the method utilizes an LSTM classification neural network model to capture changes in the respective embeddings over time periods relevant to the business. The LSTM model may be trained using labeled correlation data from sensor-ontology combinations and by minimizing a loss function through gradient descent and back propagation in the model's training phase.

In this embodiment, the compiled table provides a source for answers to questions posed by users regarding either the language found in the sensor feed data embeddings or the language found in the embeddings of the ontology.

In this embodiment, the mapping yields gaps across the set of the sensor network and the business ontology. The gaps include portions of the sensor network which do not map to any portion of the business ontology, as well as portions of the business ontology which do not clearly map to any portion of the sensor network.

In an embodiment, the method alters the business ontology by adding concepts and relationships reflected in those portions of the sensors network outputs which did not map to the ontology. The NLP analysis of the unmapped portions of the sensor network yields identified concepts and relationships between those concepts which the method adds to the ontology, expanding the ontology and reducing the gap between the sensor network and the ontology. In this embodiment, the method adds concepts and relationships according to identified relationships between the newly identified concepts and relationships and the existing concepts and relationships of the ontology.

In an embodiment, the method also adapts the sensor network to provide coverage for those identified portions of the business ontology which do not initially correspond and map to elements of the sensor network. As an example, the ontology may include a concept around a visual element such as an elk, which the analysis of the documents and related statistical data indicate should be present in the data streams. Analysis of the sensor feed and associated sensors indicates no elk detections and no sensors actually trained for the specific detection of elk. In this embodiment, the method acquires training data associated with the detection of elk from connected data libraries, or from connected network resources. The method trains at least one sensor identified as having a high potential for elk detection according to current sensor data and metadata. After the training the method re-evaluates the data streams to determine if the level of elk detection has reached the predicted level. Absent a satisfactory level of detection, the method follows a decision tree to determine next steps which may include the training of addition similar sensors for the detection of elk, the clustering of trained sensors to generate a higher average level of elk detection, the utilization of additional sensor types, such as infra-red sensors trained using an infra-red elk signature, to raise the level of elk detection by the sensor network.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the sensor output-ontology synchronization program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152. Sensor output data and ontology update data may also be received through communications unit 152. Changes to the sensor network and the otology may be communicated via communications unit 152.

I/O interface(s) 156 allows for input and output of data with other devices that may be connected to server computer 150. For example, I/O interface(s) 156 may provide a connection to external device(s) 190 such as a sensor network, a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., sensor output-ontology synchronization program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
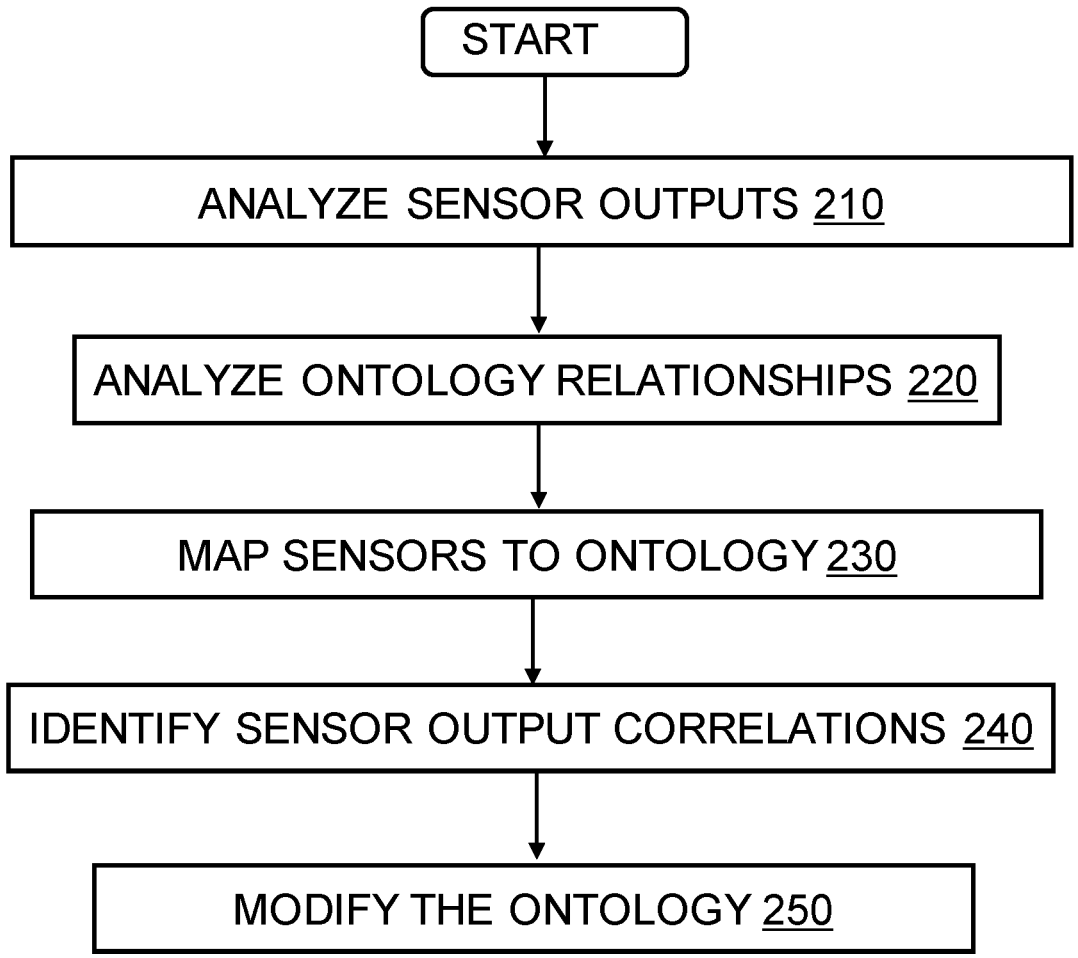
FIG. 2 provides a flowchart depicting an operational sequence, according to an embodiment of the invention.

FIG. 2 provides a flowchart 200, illustrating exemplary activities associated with the practice of the disclosure. After program start, at block 210, the method receives sensor outputs from a network of sensors and further receives a defined business ontology comprising concepts expressed together with relationships linking those concepts. The method then analyzes the sensor outputs identifying relationships between groups of two or more sensors. In an embodiment, the method analyzes textual descriptions of the sensors, defines word embeddings for the sensor descriptions and determines similarities between different sensor word embeddings according to distances between respective vector embeddings.

At block 220, the method analyzes the ontology identifying relationships between concepts in the ontology. In an embodiment, the method expresses the concepts and relationships of the ontology as word embeddings and determines similarities between respective pairings of the word embeddings according to similarities between respective vector embeddings of the relationships.

At block 230, the method maps sensors to ontology concepts, either singly or in groupings, according to similarities between the respective sensor and concept-relationship embeddings. In an embodiment, the mapping reveals gaps between the sensor network and the ontology, wherein portions of the sensor network do not correspond to any portion of the ontology and portions of the ontology do not correspond to any portion of the sensor network.

At block 240, the method evaluates changes in the ontology and the sensor output data over time and identifies correlations in sensor data feeds between two or more sensors, including correlations in changes in the data over time among the sensor data feeds. In an embodiment, the method utilizes an LSTM model to detect correlations in the changes to the sensor outputs over time. The method uses statistical methods to validate correlations detected suing the LSTM models and to determine a confidence level associated with the detected correlations.

At block 250, the method alters the ontology by adding concepts and/or relationships derived from the correlations identified at block 240. In an embodiment, the method alters the ontology by adding new concepts and relationships while another embodiment, the method alters existing relationships among existing concepts according to the identified correlations among changes in sensor data feeds. In this embodiment, the method utilizes the detected correlations having a high confidence level. In an embodiment, the method uses correlations having a confidence level above a predefined threshold. In this embodiment, the user may define the confidence threshold used for selecting correlations to be used in modifying the ontology. In an embodiment, after the ontology has been modified by the method, additional analysis and mapping between the sensor network and ontology verifies that the additions to the ontology adequately represent the correlations detected in the analysis of the sensor outputs.

Embodiments of the invention may utilize stand alone computer systems integrated with networked system sensors. In an embodiment, cloud computing resources provide access to greater computational power for the purposes of training and applying the machine learning models to the analysis of the sensor outputs and the ontology relationships.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
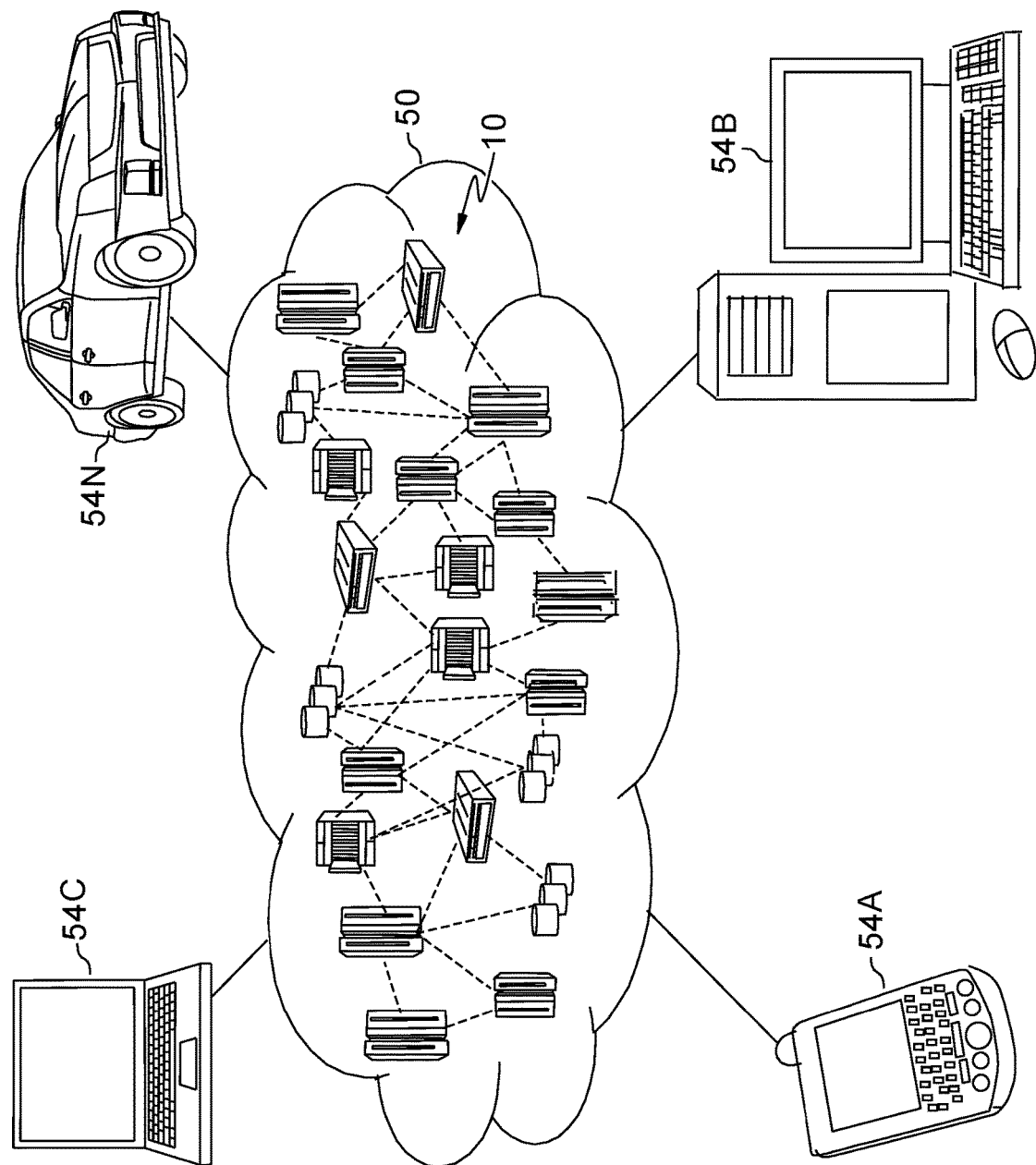
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
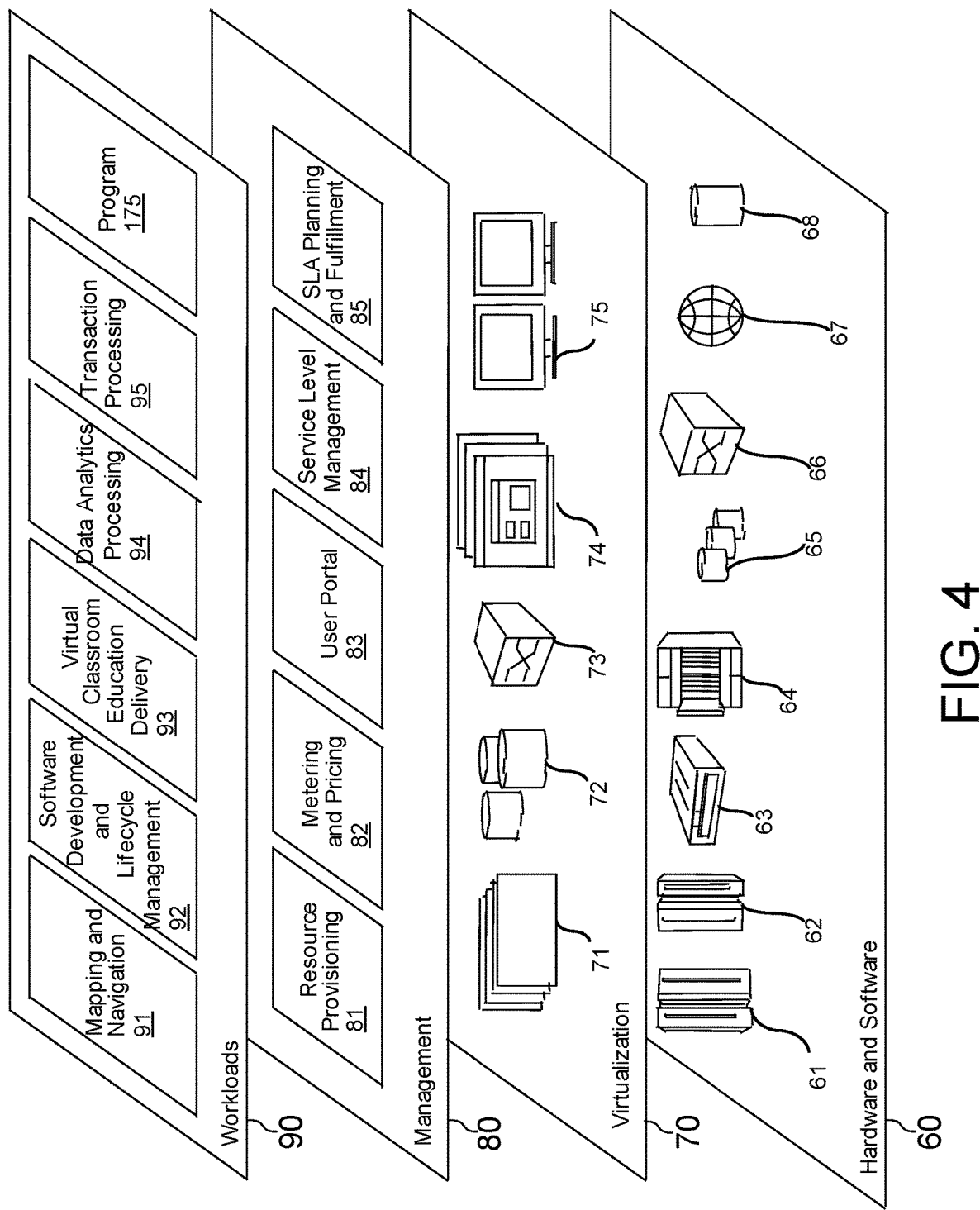
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor output-ontology synchronization program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for synchronizing a sensor network and an ontology, the method comprising:
   defining, by the one or more computer processors, at least a portion of a set of sensors as a first set of word embeddings;
   defining, by the one or more computer processors, at least a portion of the ontology as a second set of word embeddings;
   extracting, by the one or more computer processors, a first set of features from the first set of word embeddings according to sensor output changes;
   extracting, by the one or more computer processors, a second set of features from the second set of word embeddings according to ontology node changes;
   generating, by the one or more computer processors, a table correlating the first set of features and the second set of features over time;
   responding, by the one or more computer processors, to a user query according to the table;
   analyzing, by the one or more computer processors, outputs of set of sensors;
   analyzing, by the one or more computer processors, relationships of an ontology;
   mapping, by the one or more computer processors, the outputs to the relationships;
   identifying, by the one or more computer processors, a correlation among the outputs; and
   modifying, by the one or more computer processors, the ontology according to the correlation.

2. The method according to claim 1, wherein mapping the outputs to the relationships comprises correlating output rate of change to relationship rate of change.

3. The method according to claim 1, further comprising:
   defining, by one or more computer processors, at least one sensor as a sensor word embedding;
   defining, by the one or more computer processors, at least a portion of the ontology as an ontology word embedding;
   matching, by the one or more computer processors, the sensor word embedding and the ontology word embedding.

4. The method according to claim 1, further comprising clustering sensors according to sensor outputs.

5. The method according to claim 1, further comprising ignoring a sensor according to sensor outputs.

6. The method according to claim 1, further comprising modifying the sensor network according to the mapping.

7. A computer program product for synchronizing a sensor network and an ontology, the computer program product comprising one or more computer readable storage devices and collectively stored program instructions on the one or more computer readable storage devices, the stored program instructions which, when executed, cause one or more computer systems to:
- define at least a portion of a set of sensors as a first set of word embeddings;
- define at least a portion of the ontology as a second set of word embeddings;
- extract a first set of features from the first set of word embeddings according to sensor output changes;
- extract a second set of features from the second set of word embeddings according to ontology node changes;
- generate a table correlating the first set of features and the second set of features over time;
- respond to a user query according to the table;
- analyze outputs of a set of sensors;
- analyze relationships of an ontology;
- map the outputs to the relationships;
- identify a correlation among the outputs; and
- modify the ontology according to the correlation.

8. The computer program product according to claim 7, wherein mapping the outputs to the relationships comprises correlating output rate of change to relationship rate of change.

9. The computer program product according to claim 7, the stored program instructions further causing the one or more computer systems to:
- define at least one sensor as a sensor word embedding;
- define at least a portion of the ontology as an ontology word embedding; and
- match the sensor word embedding and the ontology word embedding.

10. The computer program product according to claim 7, the stored program instructions further causing the one or more computer systems to cluster sensors according to sensor outputs.

11. The computer program product according to claim 7, the stored program instructions further causing the one or more computer systems to ignore a sensor according to sensor output.

12. The computer program product according to claim 7, the stored program instructions further causing the one or more computer systems to modify the sensor network according to the mapping.

13. A computer system for synchronizing a sensor network and an ontology, the computer system comprising:
- one or more computer processors;
- one or more computer readable storage devices; and
- stored program instructions on the one or more computer readable storage devices for execution by the one or more computer processors, the stored program instructions which, when executed, cause one or more computer systems to:
  - define at least a portion of a set of sensors as a first set of word embeddings;
  - define at least a portion of the ontology as a second set of word embeddings;
  - extract a first set of features from the first set of word embeddings according to sensor output changes;
  - extract a second set of features from the second set of word embeddings according to ontology node changes;
  - generate a table correlating the first set of features and the second set of features over time;
  - respond to a user query according to the table;
  - analyze outputs of a set of sensors;
  - analyze relationships of an ontology;
  - map the outputs to the relationships;
  - identify a correlation among the outputs; and
  - modify the ontology according to the correlation.

14. The computer system according to claim 13, wherein mapping the outputs to the relationships comprises correlating sensor output rate of change to relationship rate of change.

15. The computer system according to claim 13, the stored program instructions further causing the one or more computer systems to:
- define at least one sensor as a sensor word embedding;
- define at least a portion of the ontology as an ontology word embedding; and
- match the sensor word embedding and the ontology word embedding.

16. The computer system according to claim 13, the stored program instructions further causing the one or more computer systems to cluster sensors according to sensor outputs.

17. The computer system according to claim 13, the stored program instructions further causing the one or more computer systems to ignore a sensor according to sensor output.

* * * * *